United States Patent [19]
Matsueda et al.

[11] Patent Number: 5,767,494
[45] Date of Patent: Jun. 16, 1998

[54] INFORMATION REPRODUCTION SYSTEM FOR REPRODUCING MULTIMEDIA INFORMATION RECORDED WITH OPTICALLY READABLE CODE

[75] Inventors: Akira Matsueda, Tachikawa; Tatsuo Nagasaki, Yokohama; Yasuo Nakajoh, Niiza, all of Japan

[73] Assignee: Olympus Optical Co., Ltd., Tokyo, Japan

[21] Appl. No.: 580,863

[22] Filed: Dec. 29, 1995

[30] Foreign Application Priority Data

Jan. 11, 1995 [JP] Japan ................... 7-002805

[51] Int. Cl.⁶ ........................................... G06K 7/10
[52] U.S. Cl. .................... 235/454; 235/462; 235/472
[58] Field of Search ............................ 235/454, 462, 235/472

[56] References Cited

U.S. PATENT DOCUMENTS

| | | | |
|---|---|---|---|
| 4,488,679 | 12/1984 | Bockholt et al. | 235/472 X |
| 4,906,843 | 3/1990 | Jones et al. | 235/449 X |
| 5,288,985 | 2/1994 | Chadima, Jr. et al. | 235/472 |
| 5,408,084 | 4/1995 | Brandorff et al. | 235/472 X |
| 5,486,688 | 1/1996 | Iima et al. | 235/462 |
| 5,572,007 | 11/1996 | Aragon et al. | 235/472 |

FOREIGN PATENT DOCUMENTS

| | | |
|---|---|---|
| 60-156180 | 8/1985 | Japan. |
| 61-289470 | 12/1986 | Japan. |
| 62-125479 | 6/1987 | Japan. |
| 5-182005 | 7/1993 | Japan. |
| 2257280 | 1/1993 | United Kingdom. |

*Primary Examiner*—Donald T. Hajec
*Assistant Examiner*—Michael G. Lee
*Attorney, Agent, or Firm*—Frishauf, Holtz, Goodman, Langer & Chick

[57] ABSTRACT

An IC having an image pickup element for optically picking up a code to output an image signal, and an optical system for optically inputting the code to the image pickup element are provided to a reading section for optically reading a code from an information recording medium having a portion at which multimedia information is recorded as an optically readable code. The image pickup element and the optical system are integrally arranged. Further, an IC having an image memory for storing the image signal output from the image pickup element, and an IC for reconstituting the multimedia information from the image signal are provided. A defective element due to a semiconductor manufacturing method is used for at least one of these ICs.

26 Claims, 10 Drawing Sheets

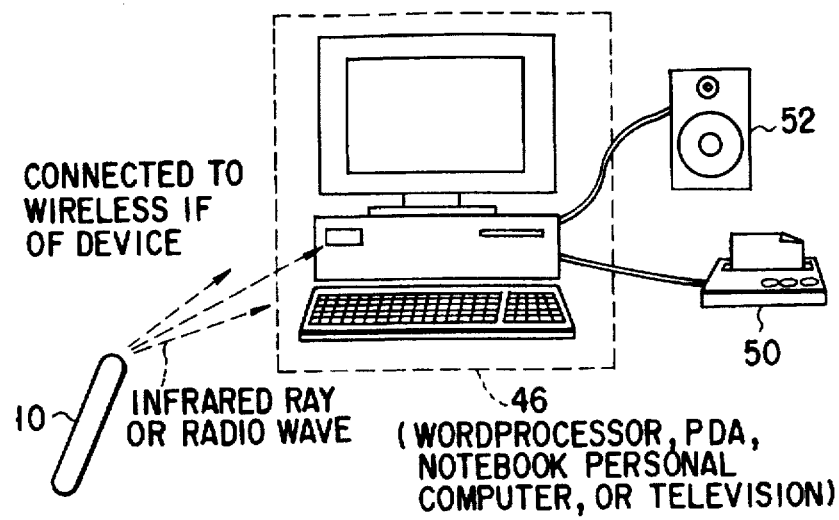
F I G. 5D
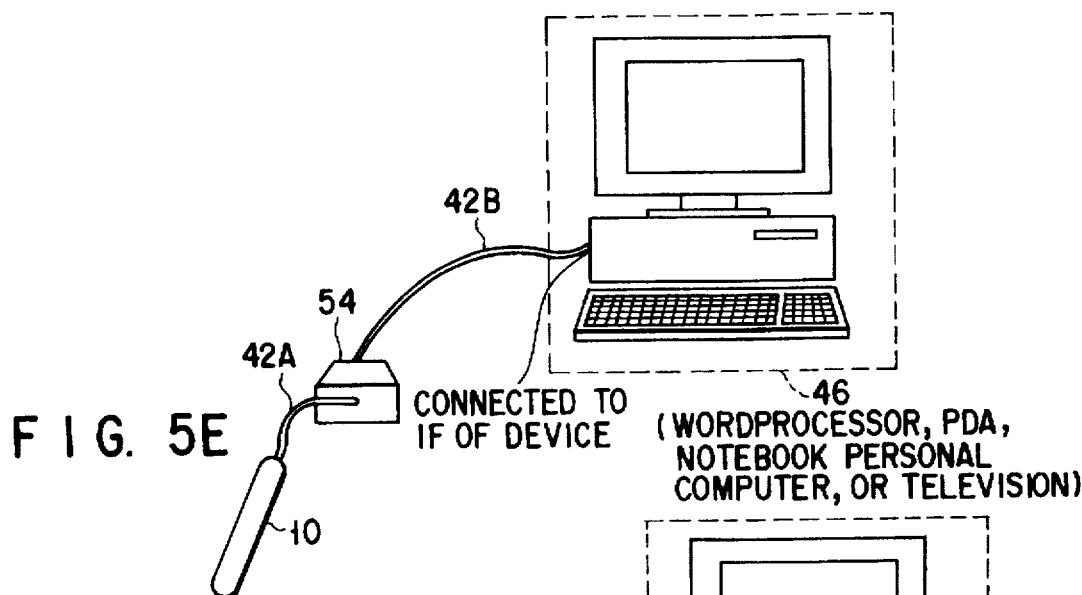
F I G. 5E
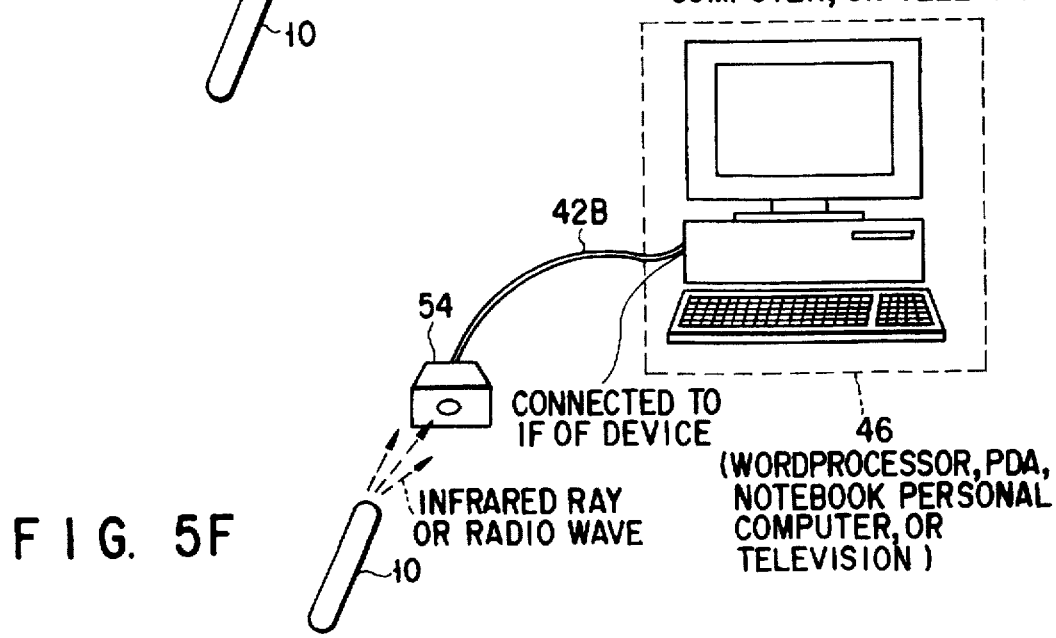
F I G. 5F

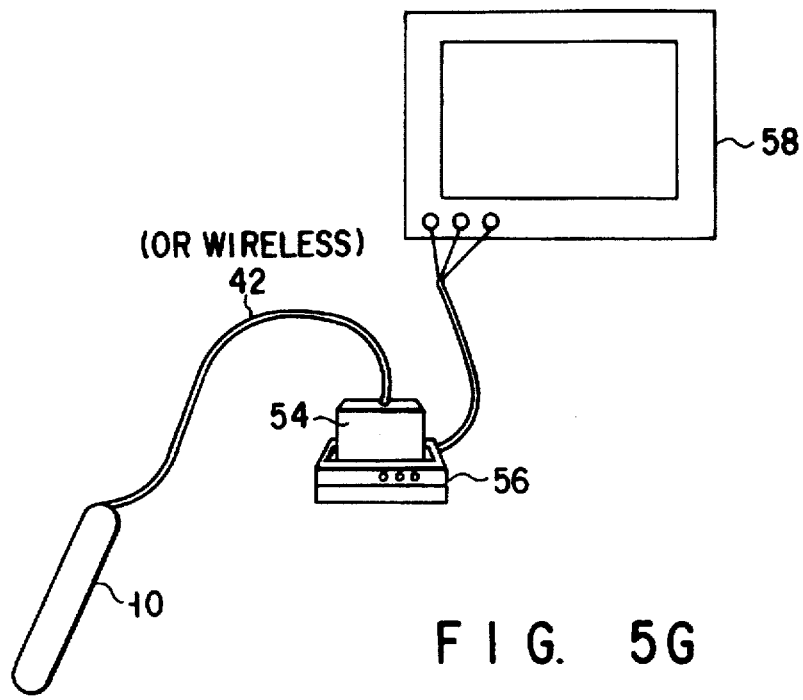
FIG. 5G
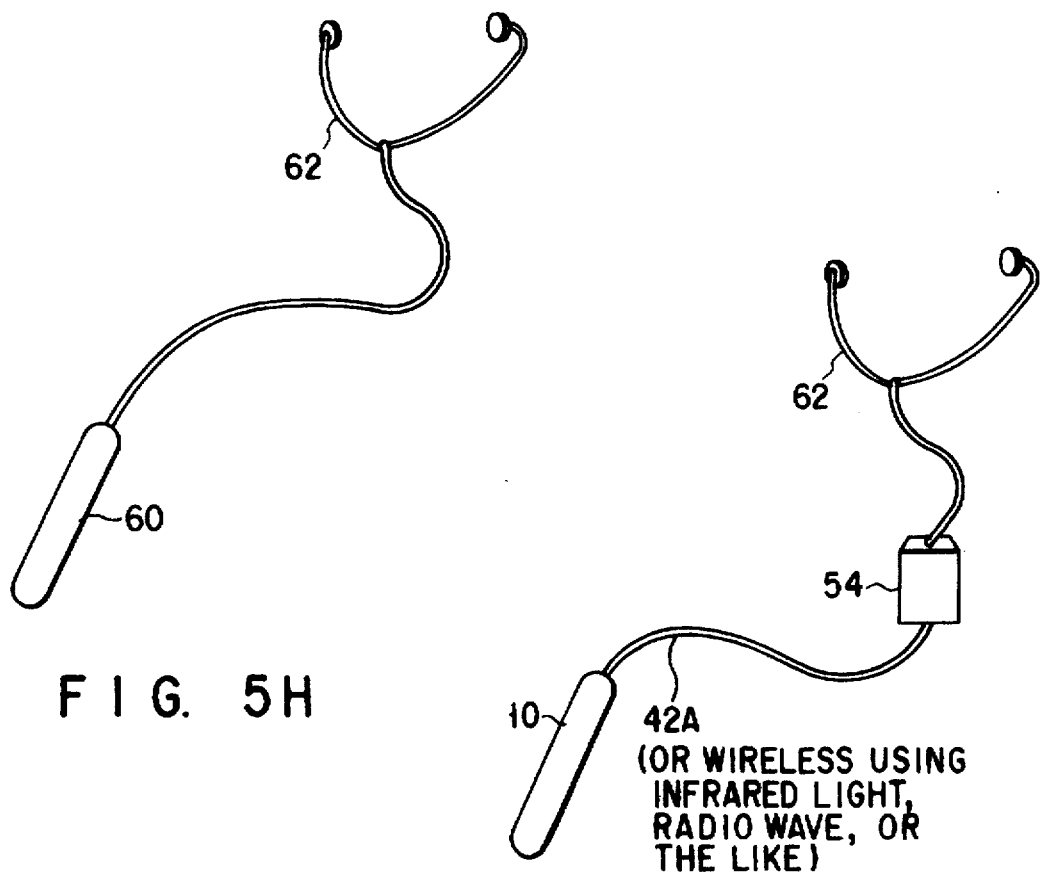
FIG. 5H
FIG. 5I

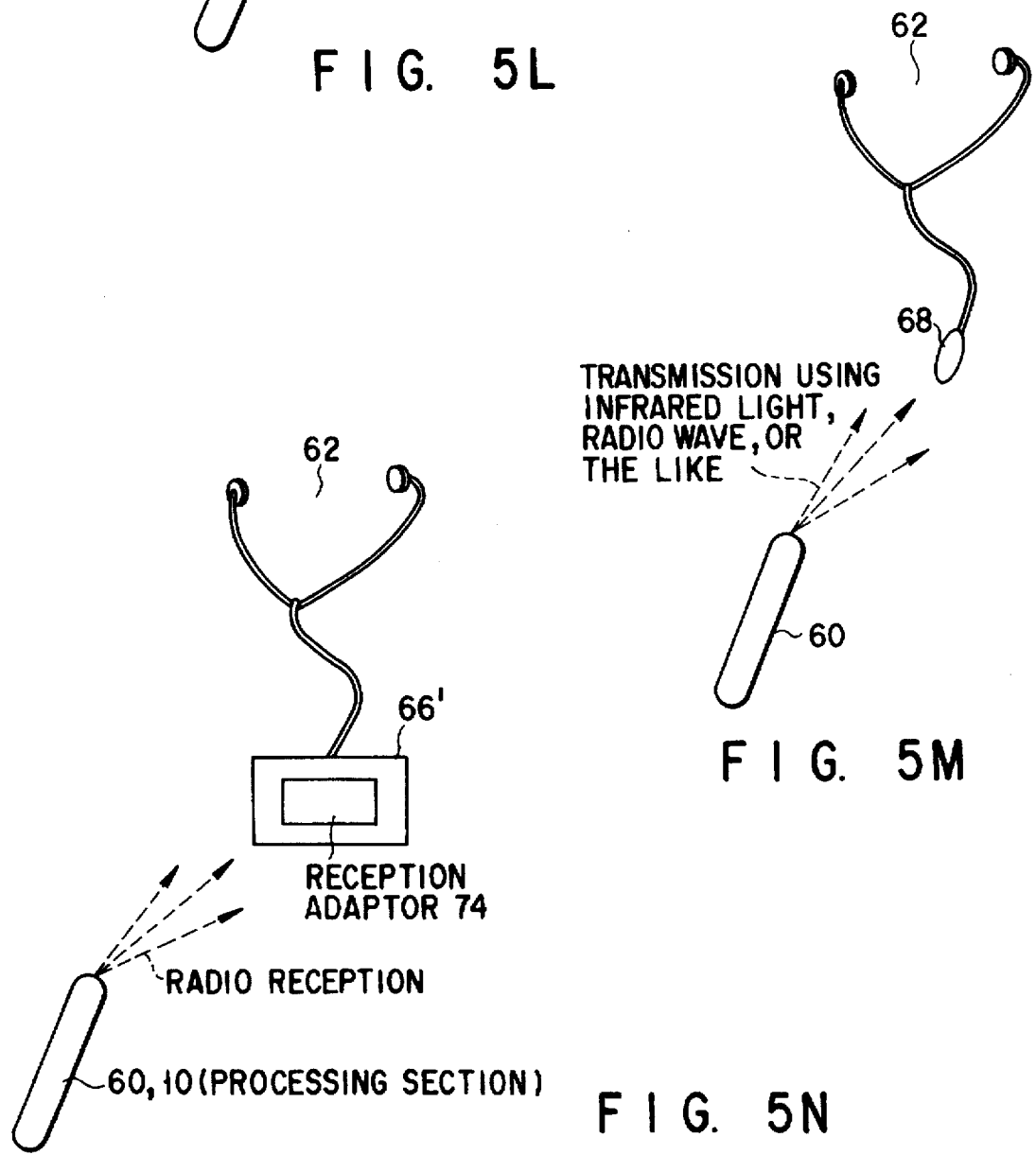

INFORMATION REPRODUCTION SYSTEM FOR REPRODUCING MULTIMEDIA INFORMATION RECORDED WITH OPTICALLY READABLE CODE

BACKGROUND OF THE INVENTION

1. Field of the Invention

The present invention relates to an information reproduction system which can optically read two-dimensional code patterns from information storage media such as a paper sheet on which so-called multimedia information including, e.g., audio information such as speech and music, image information obtained from a camera, a video device, and the like, and digital code data obtained from a personal computer, a wordprocessor, and the like are recorded as optically readable two-dimensional code patterns, thereby reproducing the original multimedia information.

2. Description of the Related Art

Conventionally, various media such as a magnetic tape and an optical disk have been known as media for recording speech and music. However, even if each medium is duplicated in large numbers, its unit price is high to a certain degree, and a large space is required for storing them. When a person needs to give a speech-recorded medium to another person at a remote location, the person cannot avoid a cumbersome, time-consuming procedure regardless of whether the medium is mailed or delivered by hand. The same is true for so-called multimedia information including, e.g., image information obtained from a camera, a video device, and the like, and digital code data obtained from information processors such as a personal computer and a wordprocessor, other than audio information.

A team of inventors including one of the inventors of the present invention has invented a system which can transmit multimedia information including at least one of audio information, image information, and digital code data by a facsimile, and which records image information capable of being duplicated in large numbers at a low cost by coding the information in a dot code format on information storage media such as a paper sheet, as well as a system for reproducing the recorded information. This prior art invention was filed as International Application No. PCT/JP93/01377 (U.S. Ser. No. 08/407,018). This international application was disclosed as International Publication No. WO 94/08314 on Apr. 14, 1994.

In the information reproduction system disclosed in this international publication, the operator holds a reading section for optically reading a two-dimensional code on an information recording medium in his/her hand to manually scan the recording medium along the recorded code, thereby reading the code.

Although a basic arrangement of this information reproduction system is disclosed in the above publication, approaches to downsizing and cost reduction in mounting various components are not particularly mentioned. For example, the reading section has an optical system and an electrical system. In mounting these systems, they are separately attached to a main body in a normal arrangement. Therefore, there is room for improvement in downsizing and cost reduction.

The production of this information reproduction system is based on an assumption that normal elements, i.e., non-defective elements are used for an image pickup element, a memory, and other elements. Also from this viewpoint, cost reduction has not been attained.

SUMMARY OF THE INVENTION

The present invention has been made in consideration of the above situation, and has as its object to provide an information reproduction system in which downsizing and cost reduction are realized.

It is another object of the present invention to mount the main components of a manual scan reading section as a unit, and to commonly use the unit for systems having various outer shapes, thereby realizing a decrease in number of components and cost reduction by means mass production.

According to one aspect of the present invention, there is provided an information reproduction system comprising:

reading means for optically reading a code from an information recording medium having a portion at which multimedia information including at least one of audio information, image information, and digital code data is recorded as an optically readable code;

processing means for processing the code read by the reading means to reconstitute the original multimedia information; and output means for reproducing and outputting each information on the basis of an output signal from the processing means, wherein the reading means comprises an image pickup element for optically picking up the code to output an image signal, and optical means for optically inputting the code to the image pickup element, and the image pickup element and the optical means are arranged integrally.

According to another aspect of the present invention, there is provided an information reproduction system comprising:

reading means for optically reading a code from an information recording medium having a portion at which multimedia information including at least one of audio information, image information, and digital code data is recorded as an optically readable code;

processing means for processing the code read by the reading means to reconstitute the original multimedia information; and output means for reproducing and outputting each information on the basis of an output signal from the processing means, wherein the reading means comprises an image pickup element for optically picking up the code to output an image signal, and optical means for optically inputting the code to the image pickup element, the processing means comprises a memory for storing an image signal output from the image pickup element, and an integrated circuit for reconstituting the multimedia information from the image signal, and all of the image pickup element, the memory, and the integrated circuit are semiconductor elements fabricated by a semiconductor manufacturing method, and at least one of the elements is a defective element due to the semiconductor manufacturing method.

According to still another aspect of the present invention, there is provided an information reproduction system comprising:

a code reading section capable of manual scanning to read a code on a recording medium;

an information processor having an expansion slot to execute predetermined processing upon reception of data from a card-type board inserted in the expansion slot;

the card-type board inserted in the expansion slot of the information processor to demodulate and process input data, thereby supplying the resultant data to the information processor; and a wireless data transmission/reception means arranged between the code reading section and the card-type board.

According to further aspect of the present invention, there is provided an information reproduction system comprising:

a code reading section capable of manual scanning to read a code on a recording medium;

an information processor having an expansion slot to execute predetermined processing upon reception of data from a processing section inserted in the expansion slot;

the processing section inserted in the expansion slot of the information processor to demodulate and process input data, thereby supplying the resultant data to the information processor; and wireless data transfer means arranged between the code reading section and the processing section.

According to another aspect of the present invention, there is provided an information reproduction system comprising:

a code reading section capable of manual scanning to read a code on a recording medium;

a television image receiver for receiving television broadcasting;

a game device connected to the television image receiver and having television speech and image signal output functions;

a processing section connected to the game device to demodulate and process input data and to supply the result to the game device, thereby supplying speech and image signals corresponding to the result from the game device to the television image receiver; and wireless data transmission/reception means arranged between the code reading section and the processing section.

According to still another aspect of the present invention, there is provided an information reproduction system comprising:

a code reading/processing section capable of manual scanning to read a code on a recording medium to perform demodulation and processing; and a radio device for receiving radio broadcasting, wherein the code reading/processing section comprises a transmission function for transmitting a speech signal demodulated and processed so as to allow the radio device to receive.

According to further aspect of the present invention, there is provided an information reproduction system comprising:

a code reading section capable of manual scanning to read a code on a recording medium;

a processing section for demodulating and processing data from the code reading section to obtain a speech signal;

data transmission means for wireless-transmitting the speech signal obtained in the processing section;

a reception unit for receiving the speech signal wireless-transmitted by the data transmission means; and electric/speech conversion means connected to the reception unit to convert the speech signal received by the reception unit into speech, thereby outputting the speech.

According to still further aspect of the present invention, there is provided an information reproduction system comprising:

a code reading/processing section capable of manual scanning to read a code on a recording medium to perform demodulation and processing; and a music information medium reproducer having an external input terminal to reproduce and output music information recorded on a music information medium, and to reproduce and output a speech signal input from the external input terminal, wherein the code reading/processing section supplies a speech signal demodulated and processed to the external input terminal of the music information medium reproducer.

According to another aspect of the present invention, there is provided an information reproduction system comprising:

a code reading/processing section capable of manual scanning to read a code on a recording medium to perform demodulation and processing, thereby obtaining a speech signal;

data transmission means for wireless-transmitting the speech signal obtained in the code reading/processing section;

a reception unit for receiving the speech signal wireless-transmitted by the data transmission means; and electric/speech conversion means connected to the reception unit to convert the speech signal received by the reception unit into speech, thereby outputting the speech.

According to still another aspect of the present invention, there is provided an information reproduction system comprising:

a code reading/processing section capable of manual scanning to read a code on a recording medium to perform demodulation and processing, thereby obtaining a speech signal;

speech signal transmission means for wireless-transmitting the speech signal obtained in the code reading/processing section;

a magnetic tape reproducer for reproducing and outputting a speech signal recorded on a magnetic tape; and a reception adaptor for receiving the speech signal wireless-transmitted by the speech signal transmission means to output the speech signal to a reproducing head of the magnetic tape reproducer by magnetic coupling.

According to further aspect of the present invention, there is provided an information reproduction system comprising:

a code reading/processing section capable of manual scanning to read a code on a recording medium;

signal transmission means for wireless-transmitting a signal corresponding to the code from the code reading section;

a magnetic tape reproducer for reproducing and outputting a speech signal recorded on a magnetic tape; and a reception adaptor for receiving the signal corresponding to the code wireless-transmitted by the signal transmission means to demodulate and process the signal, thereby obtaining a speech signal and outputting it to a reproducing head of the magnetic tape reproducer by magnetic coupling.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Preferred embodiments of the present invention will be described below with reference to the accompanying drawings.

Figure 1A:
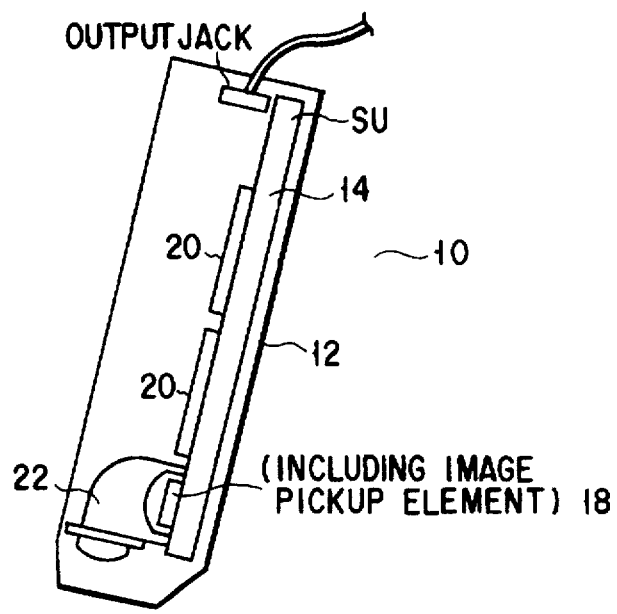
FIG. 1A is a view showing the arrangement of a reading section used for an information reproduction system according to each of embodiments.

FIG. 1A is a view showing the arrangement of a reading section 10 used for an information reproduction system according to an embodiment of the present invention. The reading section 10 has a penlike shape which allows the operator to hold it in his/her hand to scan a two-dimensional code recorded on a recording medium (not shown).

Figure 1B:
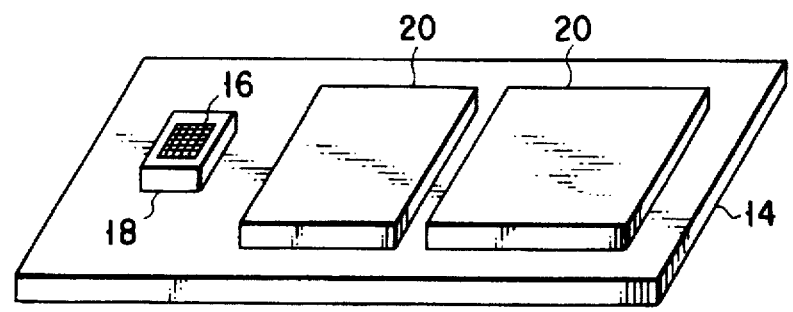
FIGS. 1B to 1D are views each showing a board unit having a hybrid IC.
Figure 1C:
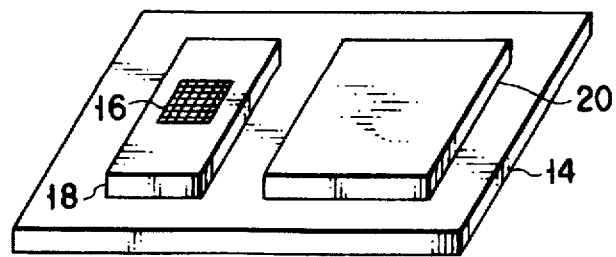
Figure 1D:
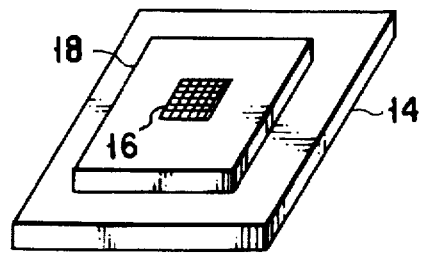

A pen-type housing 12 accommodates, e.g., an image processing section including an image pickup element and an image memory as a board unit SU having a hybrid IC. More specifically, as shown in FIG. 1B, a total of three chips, i.e., an IC chip 18 including an image pickup element 16 such as a CCD, and other IC chips 20 including an image memory and the like are placed on a board 14. As shown in FIGS. 1C and 1D, one or two chips may be arranged in accordance with a system configuration, as a matter of course.

Figure 2:
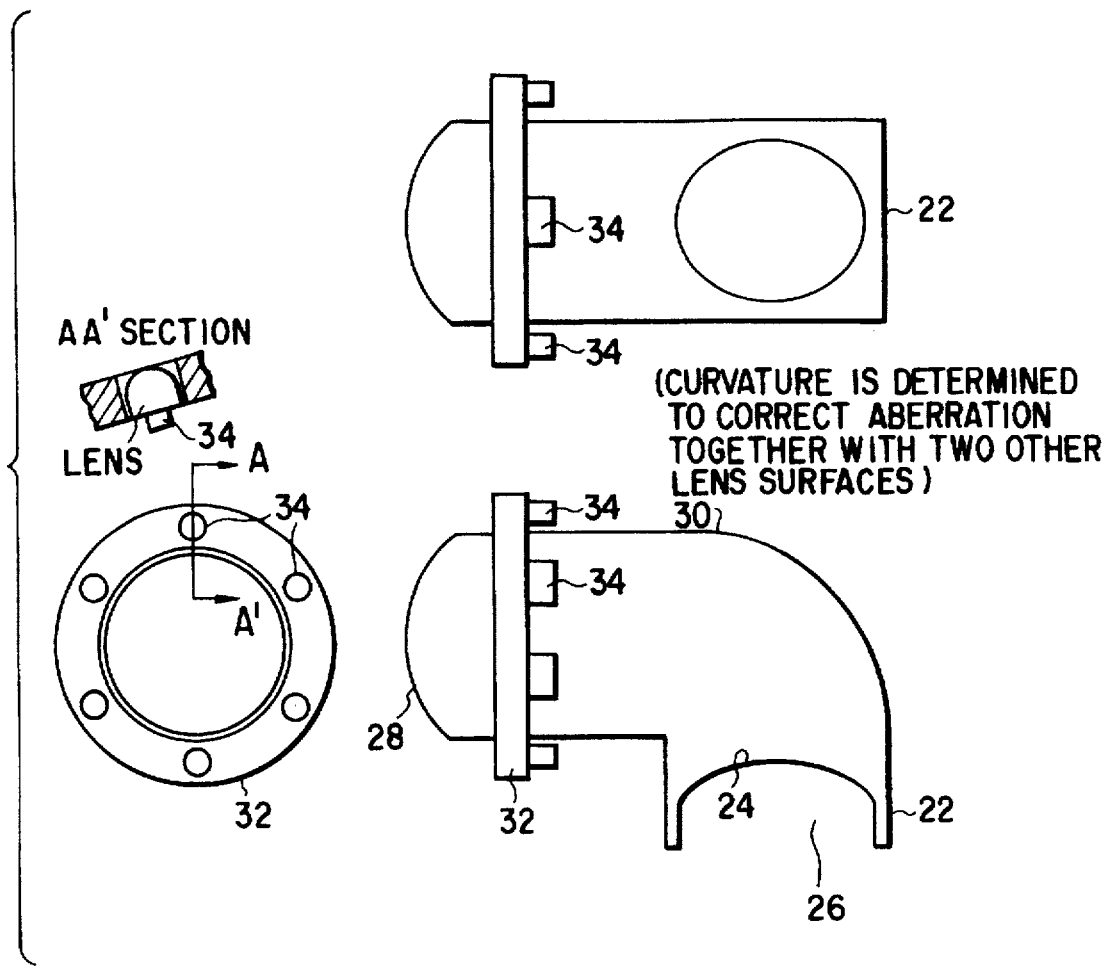
FIG. 2 is a view showing an optical system.

The board 14 is arranged along the longitudinal direction of the pen-type housing 12. An optical system 22 is provided for reflecting incident light at a substantially right angle so as to form an image from the incident light on the image pickup element 16 arranged on the board 14 with its imaging plane facing upward. More specifically, the optical system 22 for forming the image of a two-dimensional code scanned by the image pickup element 16 on the IC chip 18 is integrally arranged on the IC chip 18 including the image pickup element 16. The optical system 22 is integrally formed of, e.g., a synthetic resin material or glass which is bent at 90°, as shown in FIG. 2. The optical system 22 has, on one end side, a recessed portion 26 with a concave lens surface 24 for accommodating the IC chip 18 including the image pickup element 16, and, on the other end side, an aspherical lens surface 28. A reflecting surface 30 is provided to the portion bent at 90°. Its curvature is determined to correct aberrations together with the two lens surfaces 24 and 28.

By bending the optical axis from the pen axis direction to the direction perpendicular to it through the optical system 22 in the pen-like shape, the longitudinal direction of the board 14 can correspond to the pen axis direction. The board 14 is easily accommodated in the pen-like shape with which the operator easily handles.

The optical system 22 is attached such that part of the molded body of the optical system 22 serving as a mounting portion is directly inserted under pressure or fitted on the board 14 on which the IC chip 18 including the image pickup element 16 is mounted.

A ring-like illumination system 32 is inserted under pressure or fitted at a given position of the optical system 22 near the aspherical lens surface 28. On the illumination system 32, illumination light sources 34 such as LEDs and the like are arranged in a circle at a predetermined interval.

The thickness (height with respect to the board 14) of the pen-type housing 12 is substantially determined in accordance with the height, from the mounting board 14, of the optical system 22 integrally arranged on the image pickup element 16. That is, the thickness of the housing 12 can be substantially uniquely determined in accordance with the height of the optical system 22. For this reason, the mechanical design of the housing 12 becomes simple, and the board unit SU can be easily mounted on the housing 12 even if the pen-type housing 12 is compact, or the diameter of its outer shape is small.

In this manner, components are mounted as a unit to realize downsizing. At the same time, no optical adjustment is required.

More specifically, in a general optical system such as an optical (magnetic) disk, a plurality of optical elements must be precisely adjusted to assure the qualities of detection signals (the sensitivity of a focus signal, the S/N ratio and amplitude of a read signal, and the like). For example, to adjust the focal position and the position of detection light on a detector, an optical detection element must be adjusted. To the contrary, a two-dimensional code is detected by the image pickup element 16, i.e., an area sensor. As for the position of an image projected on the image pickup element 16, the precision is not so strictly required as that of a disk device. As for distortion of an image, a high optical precision is not required if a detection algorithm is contrived to eliminate the influence of distortion.

In this embodiment, a high density and cost reduction can be easily realized in mounting an optical system, as described above.

Figure 3:
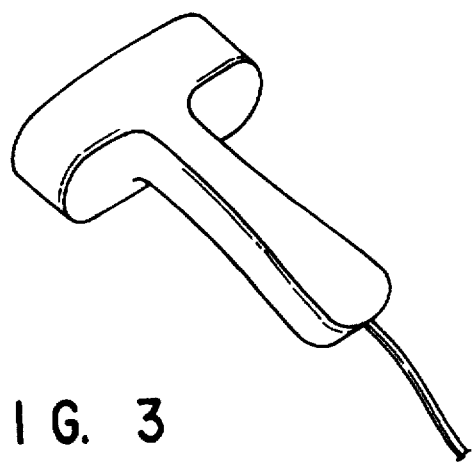
FIG. 3 is a view showing the outer appearance of a hand-held-type reading section.

This unit is applied to not only the pen-type housing 12 but also housings having various outer shapes, e.g., a general T-shaped hand-held scanner housing as shown in FIG. 3 to reduce the cost.

Figure 4A:
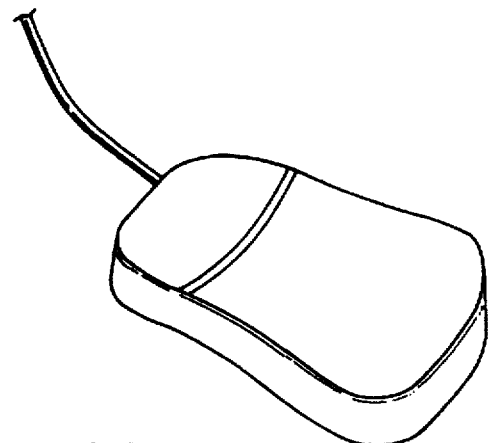
FIGS. 4A and 4B are views showing the outer appearance and internal structure of a mouse-type reading section, respectively.
Figure 4B:
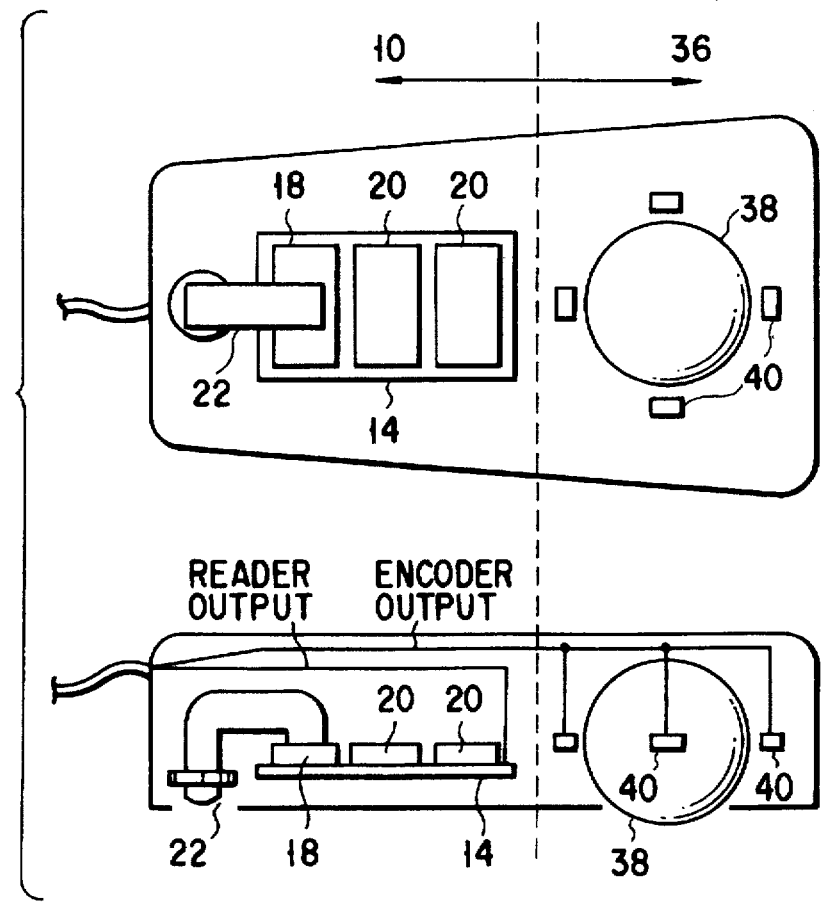

This unit can be incorporated in a mouse well-known as a pointing device, as shown in FIG. 4A. That is, as shown in FIG. 4B, the reading section 10 is added to a mouse, while keeping the function of a coordinate generation section 36 constituted by a ball 38, an encoder 40, and the like that the mouse normally has. This arrangement allows one housing to have both the functions. In this case, the optical system 22 must be bent at 90° once more. Otherwise, the image can be formed directly on the imaging plane of the image pickup element 16 without bending the optical path.

A two-dimensional code read by the above reading section 10 accommodating the image processing section is subjected to data processing such as demodulation (to be described later). The processed code is reproduced and output.

Figure 5A:
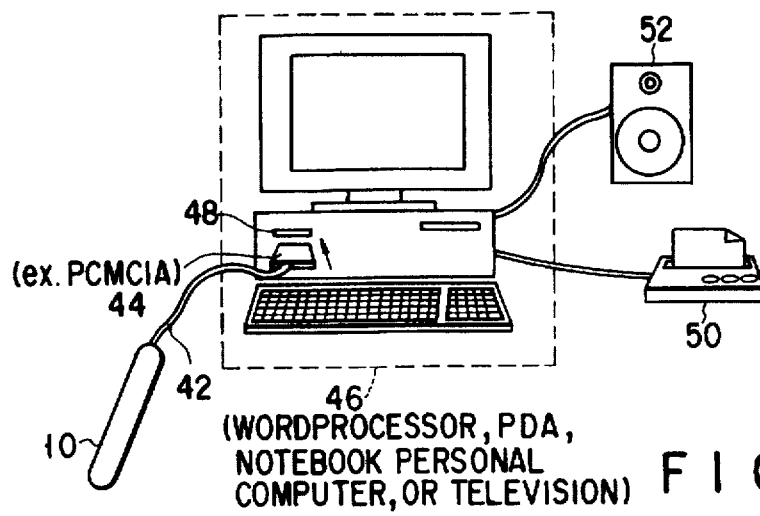
FIGS. 5A to 5N are views each showing the outer appearance of the information reproduction system according to each of embodiments.
Figure 5B:
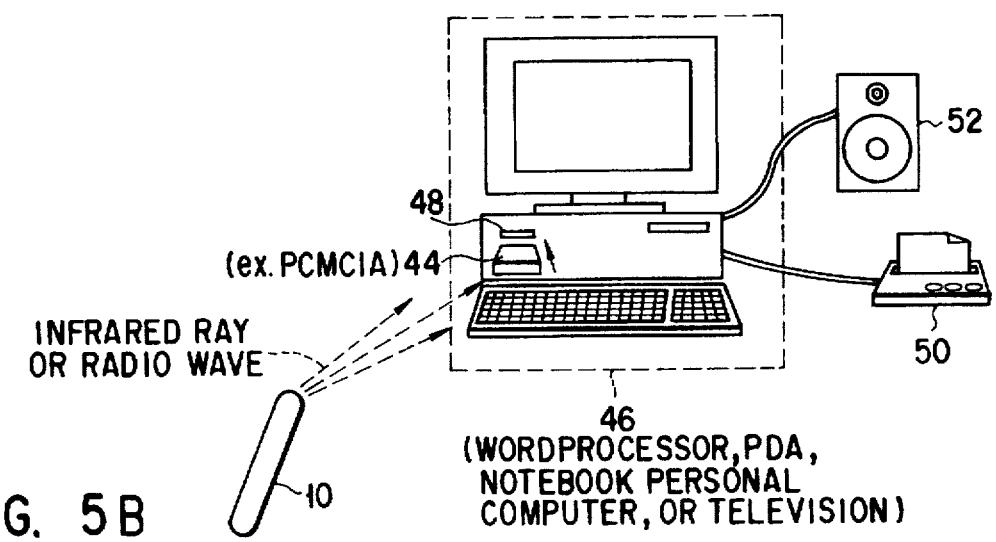

For example, as shown in FIG. 5A, a data processing section for demodulation and the like is arranged on an interface (IF) board or IF card (e.g., a card on the PCMCIA standards) 44 connected to the reading section 10 through a cable 42. This card is inserted in an expansion slot 48 of a personal computer (a wordprocessor, a PDA, a notebook personal computer, a television, or the like) 46. An image is displayed on the display of the personal computer 46, characters are printed out from a printer 50 connected to the personal computer 46, or a speech is output from a loudspeaker 52 connected to the personal computer 46. In this case, instead of connecting the reading section 10 to the IF board or IF card 44 through the cable 42, data may be wireless-transmitted using infrared light or a radio wave, as shown in FIG. 5B.

Figure 5C:
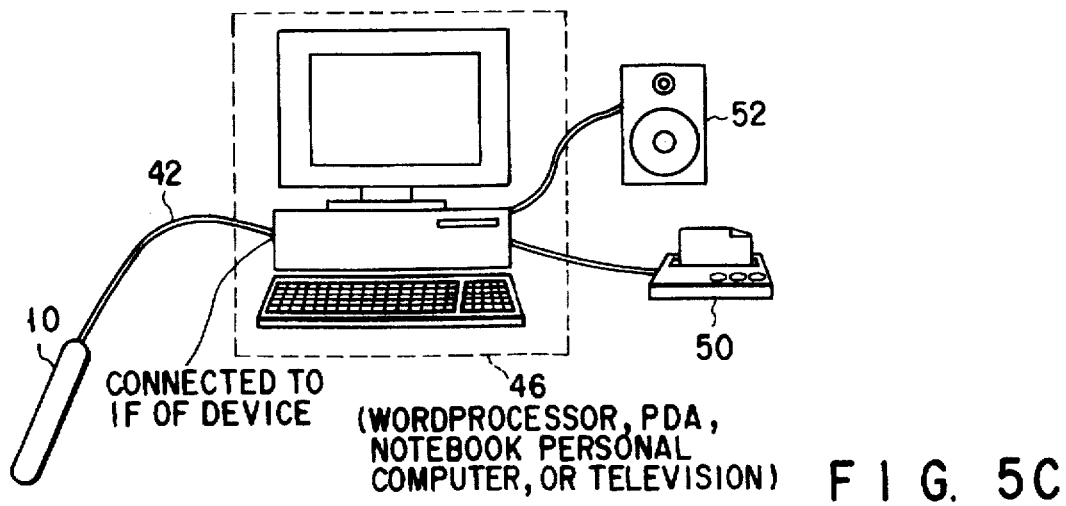

According to another embodiment of the present invention, the reading section 10 may be connected through the IF cable 42 incorporated in the personal computer 46, as shown in FIG. 5C. Data is processed by the personal computer 46 using software. Also in this case, as shown in FIG. 5D, data may be wireless-transmitted using infrared light or a radio wave, as a matter of course.

As shown in FIG. 5E, in a further embodiment of the present invention, data may be processed in an independent processing section 54 connected to the reading section 10 through a cable 42A. The processing section 54 may be connected through an IF cable 42B incorporated in the personal computer 46. Also in this case, as shown in FIG. 5F, data may be wireless-transmitted from the reading section 10 to the processing section 54 using infrared light or a radio wave, as a matter of course.

Further, as shown in FIG. 5G, an image and speech may be reproduced and output to a television image receiver 58 by utilizing a game device 56 incorporating a CPU, instead of the personal computer 46.

When only speech information including no image information is two-dimensionally coded, the arrangement of the data processing section is simplified. As shown in FIG. 5H, the reading section and the processing section are accommodated in one housing to constitute a reading/processing section 60, and a headphone 62 is connected to the reading/processing section 60 through the cable 42 to reproduce and output speech. As shown in FIG. 5I, the reading section 10 and the processing section 54 may be separately arranged and wireless-connected through the transmission cable 42A using infrared light or a radio wave.

Figure 5J:
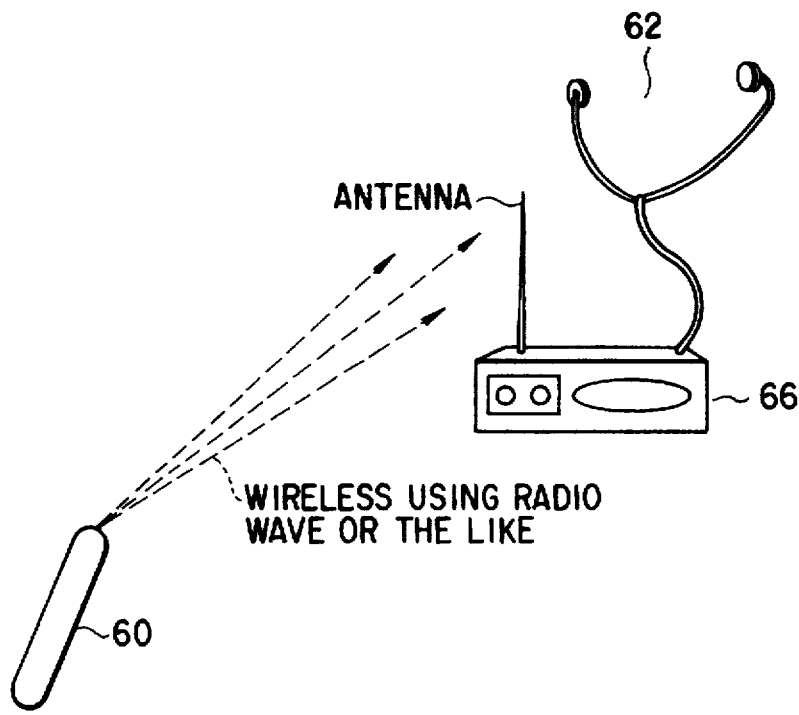
Figure 5K:
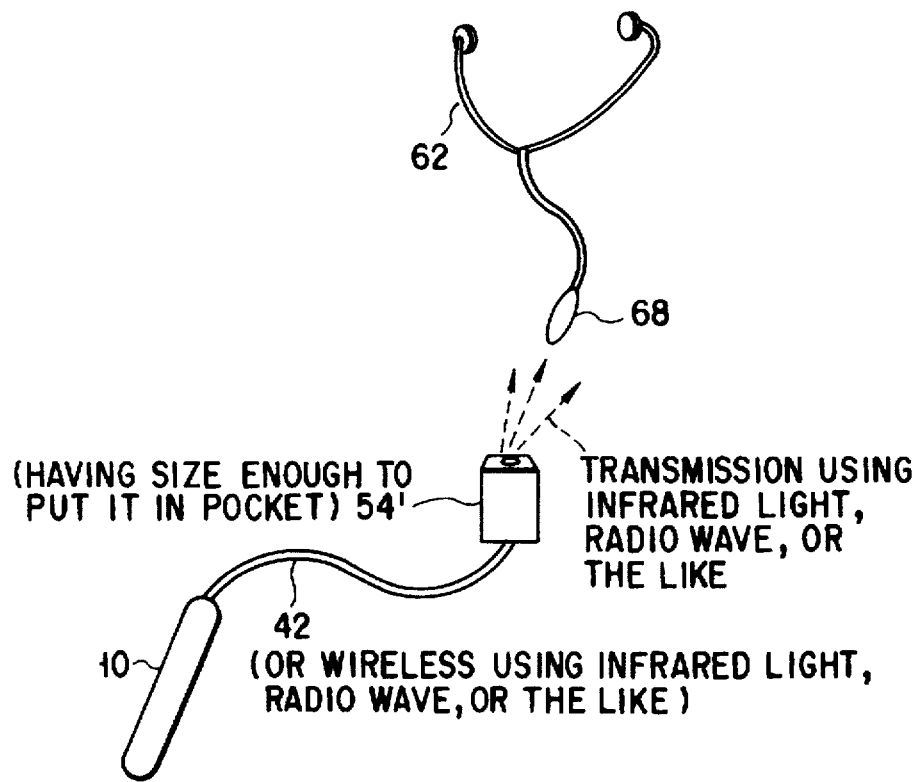

As shown in FIG. 5J, the reading/processing section 60 may incorporate a low-power transmitter to transmit reproduced speech. The speech is received by a radio cassette tape recorder or radio 66 and output from a headphone 62 using a free radio channel. In addition, as shown in FIG. 5K, a compact processing section 54' having a size enough to put it in a pocket may be used as the processing section. Speech wireless-transmitted from the processing section 54' using infrared light or a radio wave is received by a compact reception unit 68 and output from the headphone 62 connected to the compact reception unit 68. Further, as shown in FIG. 5L, the reading/processing section 60 may be connected to an external input terminal 72 of a music information reproducer 70 for reproducing music information from music information media such as a CD, an MD, and a cassette tape.

Moreover, as shown in FIG. 5M, the pen-type housing 12 may have reading and processing functions. Data is wireless-transferred from the reading/processing section 60 to the compact reception unit 68. In this case, in the reading/processing section 60, data is demodulated to analog speech, and the analog speech is output using a radio wave or the like. Alternatively, digital data is output to the compact reception unit 68 and D/A-converted on the compact reception unit 68 side. Still further, as shown in FIG. 5N, the pen-type housing 12 may have reading and processing functions. Data is demodulated to an analog speech signal. The analog speech signal is wireless-transfer using a radio wave. A reception adaptor 74 on the reception side outputs the received signal to the reproducing head of a cassette tape reproducer 66' by magnetic coupling. That is, data can be reproduced using the reproduction system of the cassette tape reproducer 66'.

Figure 6:
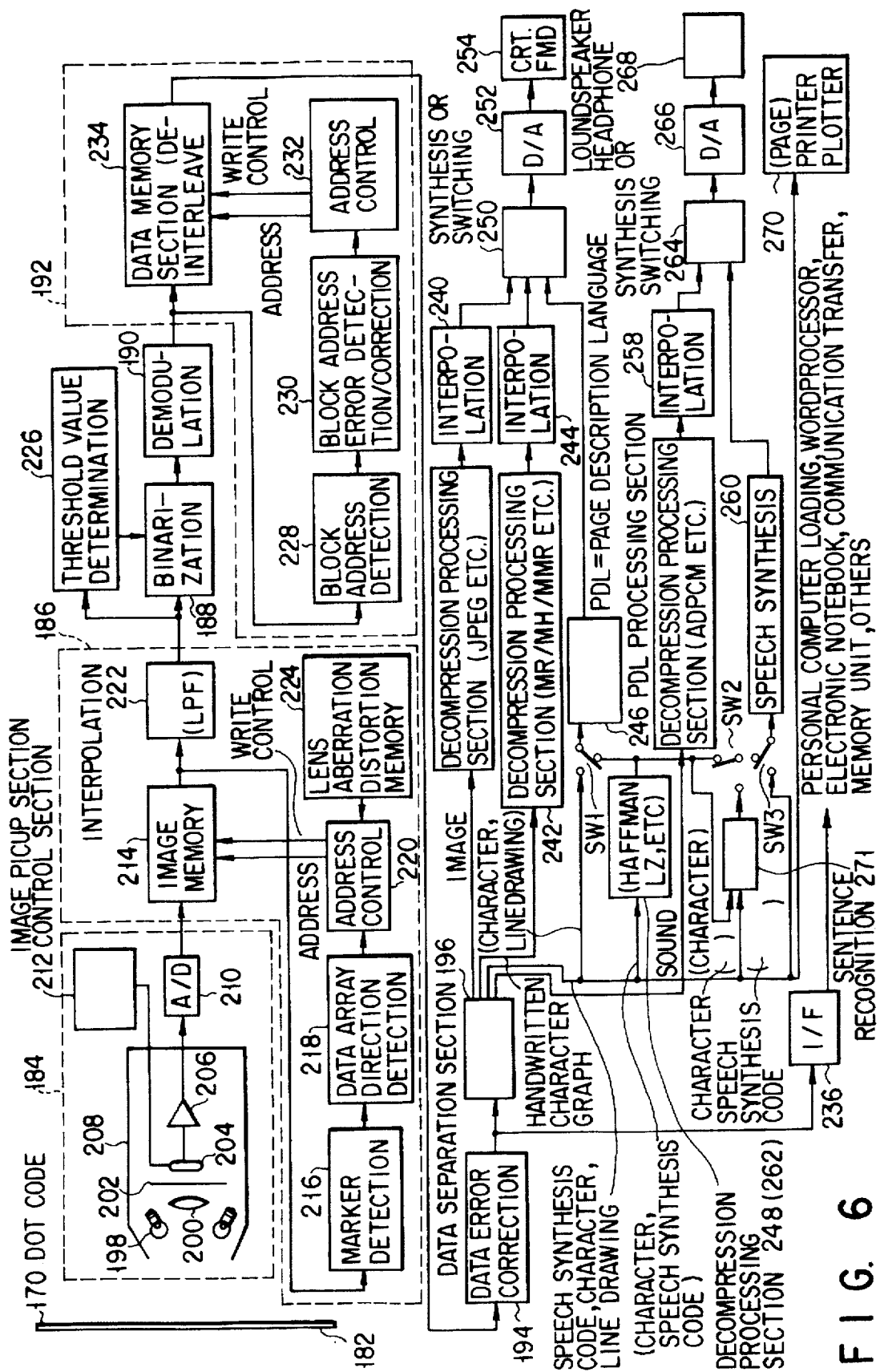
FIG. 6 is a block diagram showing the information reproduction system according to the embodiments.

The arrangements of the above reading section 10, the above processing section 54, and the like will be described with reference to FIG. 6. FIG. 6 is a block diagram showing an information reproduction system disclosed in International Publication No. WO 94/08314 as FIG. 19.

This information reproducing apparatus comprises a detection section 184 for reading a dot code from a sheet 182 on which a dot code 170 is printed, a scan conversion section 186 for recognizing image data supplied from the detection section 184 as a dot code and normalizing it, a binarization processing section 188 for converting multi-value data into binary data, a demodulating section 190, an adjusting section 192 for adjusting a data string, a data error correction section 194 for correcting a read error in a reproducing operation and a data error, a data separation section 196 for separating data in accordance with their attributes, a decompression processing section for performing processing against data compression processing in accordance with the attributes of data, and a display section, a reproducing section, or another input device.

In the detection section 184, the dot code 170 on the sheet 182 is illuminated with a light source 198; reflected light is detected as an image signal by an image pickup section 204 such as a CCD or a CMD, designed to convert optical information into an electrical signal, via an image formation optical system 200 such as a lens and a spatial filter 202 forremoving moiré and the like; and the image signal isamplified by a preamplifier 206 to be output. The light source 198, the image formation optical system 200, the spatial filter 202, the image pickup section 204, and the preamplifier 206 are arranged in an external light shielding section 208 for preventing disturbance caused by external light. The image signal amplified by the preamplifier 206 is converted into digital information by an A/D conversion section 210 and supplied to the scan conversion section 186 on the next stage.

Note that the image pickup section 204 is controlled by an image pickup section control section 212. Assume that a CCD of an interline transfer scheme is to be used as the image pickup section 204. In this case, the image pickup section control section 212 outputs the following control signals to the image pickup section 204: a vertical blanking signal for vertical synchronization; an image pickup element reset pulse for resetting information charges; a charge transfer gate pulse signal for transferring charges stored in a two-dimensionally arrayed charge transfer/storage section to a plurality of vertical shift registers; a horizontal charge transfer CLK signal as a transfer clock signal for a horizontal shift register for transferring charges in the horizontal direction and externally outputting them; a vertical charge transfer pulse signal for transferring the charges from the vertical shift registers in the vertical direction and supplying them to the horizontal shift register, and the like.

The image pickup section control section 212 supplies an emission cell control pulse to the light source 198 to adjust the emission timing of the light source 198 in accordance with the above timings.

The scan conversion section 186 is a section for recognizing image data supplied from the detection section 184 as a dot code, and normalizing it. As a technique for this operation, the image data from the detection section 184 is stored in an image memory 214, read out therefrom temporarily, and supplied to a marker detection section 216. The marker detection section 216 detects a marker of each block. A data array direction detection section 218 detects the rotation or inclination and the array direction of the data by using the markers. An address control section 220 reads out image data from the image memory 214 and supplies the data to an interpolation circuit 222 so as to correct it in accordance with the detection result. At this time, lens aberration information is read out from a memory 224 for correcting the distortion of the aberration of the lens of the image formation optical system 200 of the detection section 184, thereby performing lens correction as well. The interpolation circuit 222 performs interpolation processing of the image data to convert it into an original pattern, i.e., a dot code.

An output from the interpolation circuit 222 is supplied to the binarization processing section 188. The dot code 170 is basically a black and white pattern, i.e., binary information. Therefore, the data is converted into binary data by the binarization processing section 188. At this time, binarization is adaptively performed while threshold value determination is performed by a threshold value determination circuit 226 in consideration of the influences of disturbance, signal amplitude, and the like.

Since modulation has been performed, the demodulating section 190 demodulates the data, and inputs the resultant data to the data string adjusting section 192.

In the data string adjusting section 192, the block addresses of the above two-dimensional blocks are detected by a block address detection section 228 first, and error detection and correction of the block addresses are then performed by a block address error detection/correction section 230. Thereafter, an address control section 232 stores the resultant data in a data memory section 234 in units of blocks. By storing the data in units of block addresses in this manner, the data can be efficiently stored even if an intermediate data portion is omitted or data is inserted in the process of storing the data.

After this operation, error correction of the data read out from the data memory section 234 is performed by the data error correction section 194. An output from the data error correction section 194 is branched to two ways. One output is supplied, as digital data, to a personal computer, a wordprocessor, an electronic notebook, or the like. The other output is supplied to the data separation section 196 to be separated into image data, handwritten character or graph data, character or line drawing data, and sound data (including two types, i.e., sound data without any processing and data having undergone speech synthesis).

Image data corresponds to natural image data, which is multi-value image data. A decompression processing section 238 performs decompression processing of this data, which corresponds to JPEG in data compression. In a data interpolation circuit 240, data for which error correction cannot be performed is interpolated.

For binary image information as of a handwritten character or a graph, a decompression processing section 242 performs decompression processing corresponding to MR/MH/MMR in data compression. In a data interpolation circuit 244, data for which error correction cannot be performed is interpolated.

Character or line drawing data is converted into a different pattern for display by a PDL (Page-Description Language) processing section 246. Note that even line drawing or character information which has been coded and undergone compression processing for a code is subjected to corresponding decompression (Huffman coding, Lempel-Ziv coding, or the like) processing in a decompression processing section 248, and is supplied to the PDL processing section 246.

Outputs from the data interpolation circuits 240 and 244 and the PDL processing section 246 are synthesized or selected by a synthesizing/switching circuit 250. The resultant data is converted into an analog signal by a D/A conversion section 252. Thereafter, the corresponding information is displayed on a display section 254 such as a CRT (TV monitor) or an FMD (face mounted display). Note that the FMD is a glasses-type monitor (handy monitor) to be mounted on the face of the user, and can be effectively used for, e.g., a virtual reality operation or looking at an image on a large frame in a narrow place.

Speech information is subjected to decompression processing in a decompression processing section 256, which corresponds to ADPCM. Furthermore, in a data interpolation circuit 258, data for which error correction cannot be performed is interpolated. In performing speech synthesis, a speech synthesis section 260 receives a code for speech synthesis, actually synthesizes speech from the code, and outputs it. In this case, if the code itself is compressed, speech synthesis is performed after decompression processing such as Huffman coding or Lempel-Ziv coding processing is performed in a decompression processing section 262, as in the case of the above character or line drawing information.

Furthermore, character information may be output, as speech information, from the speech synthesis section 260 after sentence recognition is performed by a sentence recognition section 271.

The decompression processing section 262 may also serve as the decompression processing section 248. In this case, data is properly switched by switches SW1, SW2, and SW3 in accordance with the attribute of the data subjected to decompression processing so as to be input to the PDL processing section 246 or the speech synthesis section 260.

Outputs from the data interpolation circuit 258 and the speech synthesis section 260 are synthesized or selected by a synthesizing/switching circuit 264. The resultant data is then converted into an analog signal by a D/A conversion section 266. The signal is output to the loudspeaker 52, the headphone 62 or a speech output device 268 equivalent thereto.

Character of line drawing information is directly output from the data separation section 196 to a page printer or plotter 270. As a result, the character information can be printed, as wordprocessor characters, on a paper sheet, or the line drawing information can be output, as a drawing, from a plotter.

As is apparent, image information can also be printed by a video printer as well as being displayed on a CRT or an FMD, or the image can be photographed.

The image memory 214 and the data memory section 234 are independently constituted in series with each other. Alternatively, they may be connected using a bus arrangement, or they may be constituted by a common memory, as a matter of course.

In the information reproduction system having this arrangement, when the image pickup element and the image memory are accommodated as the board unit SU having a hybrid IC in the pen-type housing 12 described above with reference to FIGS. 1A to 1D, e.g., the preamplifier 206, the A/D conversion section 210, and the image pickup section control section 212 in the detection section 184, the scan conversion section 186, the binarization processing section 188, and the threshold value determination circuit 226 can be included in the IC chip 18 having the image pickup element 16 in the reading section 10 (in the case of one chip), or in the IC chips 20 except for the IC chip 18 (in the case of two or more chips). That is, part up to the binarization processing section is formed into an IC.

Alternatively, part up to the data error correction section 194 may be included in an IC chip. That is, the demodulating section 190, the data string adjusting section 192, and the data error correction section 194 are formed into an IC together with the preamplifier 206, the A/D conversion section 210, and the image pickup section control section 212 on the detection section 184, the scan conversion section 186, the binarization processing section 188, and the threshold value determination circuit 226.

Further, a portion for outputting data in a specific interface format may be included in an IC chip. In this case, e.g., the I/F 236 for outputting MIDI (Musical Instrument Digital Interface) data is formed into an IC together with the arrangement up to the data error correction section 194.

Part up to a speech/image output section may be included in an IC chip in addition to the data error correction section 194. That is, an IC may include the preamplifier 206, the A/D conversion section 210, and the image pickup section control section 212 in the detection section 184, the scan conversion section 186, the binarization processing section 188, the threshold value determination circuit 226, the demodulating section 190, the data string adjusting section 192, the data error correction section 194, the data separation section 196, the decompression processing section 238, the data interpolation circuit 240, the decompression processing section 242, the data interpolation circuit 244, the PDL processing section 246, the decompression processing section 248, the synthesizing/switching circuit 250, the D/A conversion section 252, the decompression processing section 256, the data interpolation circuit 258, the speech synthesis section 260, the decompression processing section 262, the sentence recognition section 271, the switches SW1, SW2, and SW3, the synthesizing/switching circuit 264, and the D/A conversion section 266.

The prior art is based on an assumption that normal elements, i.e., non-defective elements are used for an image pickup element, a memory, and other elements. Due to this assumption, cost reduction has not been attained. That is, a defective portion is checked and the element having the defective portion is removed from a lot in advance, or the address of a defective portion of the element is recorded in advance not to use this address. As for the image pickup element, elements are actually selected in accordance with the number of defects and the degree of concentration of defects. The selected elements are discarded as defective elements.

In this embodiment, however, data projected or recorded at a defective portion is subjected to error detection/correction processing by the data error correction section 194 to reconstitute correct data. As for burst-like defects, since data is interleaved, the defects are decentralized upon deinterleave processing in the data string adjusting section 192 to be changed into random errors. Defective elements can be used for the image pickup element 16 (image pickup section 204), the image memory 214, the data memory section 234, and the like. By using defective elements, cost reduction can be realized. Since errors are subjected to error detection/correction processing, a cumbersome operation of detecting a defect for each element or device and avoiding the use of the defective portion need not be performed.

Elements having simple logic errors can be allowed for the sections on the preceding stage of the data error correction section 194 in addition to the image pickup element and the memory as far as the errors are not large.

On the other hand, when the image pickup element and the image memory are accommodated as the board unit SU having a hybrid IC in the pen-type housing 12 described above with reference to FIGS. 1A to 1D, circuit systems can be divided into some groups to form the groups in separate ICs. In selecting a certain IC, ICs can be selected on the basis of respective selection standards. That is, different standards, i.e., a selection standard for a certain IC, a selection standard for an IC corresponding to another portion, and a selection standard for an IC corresponding to still another portion are set such that a certain portion is allowed to have a considerable number of errors (defects), another portion is allowed to have a small number thereof, and still another portion must not have an error. By setting these standards, the IC manufacturing precision of a portion having a large defect allowable rate can be set low, thereby increasing the yield and realizing mass production at a low cost.

For example, the following grouping can be considered. More specifically, the image pickup section 204, the A/D conversion section 210, the image pickup section control section 212, the image memory 214, the interpolation circuit 222, the binarization processing section 188, the threshold value determination circuit 226, the demodulating section 190, and the data memory section 234 are formed into an IC as the first circuit section (IC chip 18 having the image pickup element). The marker detection section 216, the data array direction detection section 218, the address control section 220, the memory 224 for correcting the distortion of the aberration of a lens, the block address detection section 228, the block address error detection/correction section 230, and the address control section 232 are formed into an IC as the second circuit section (IC chip 20). The data string adjusting section 192 is formed on an IC chip as the third circuit section (IC chip 20). In this case, the distribution of defect generation in an IC manufacturing apparatus is measured. The first circuit section is arranged in a region having a high defect generation rate, and the second circuit section requiring reliability and precision is arranged in a region having a low defect generation rate. If a region having a defect generation rate of 0 in which the third circuit section can be arranged can be assured, the third circuit section is integrated with the second circuit section.

Alternatively, the image pickup section 204 and the image memory 214 may be arranged as separate circuit sections.

A detailed example of error distribution in the above case will be described below.

Figure 7:
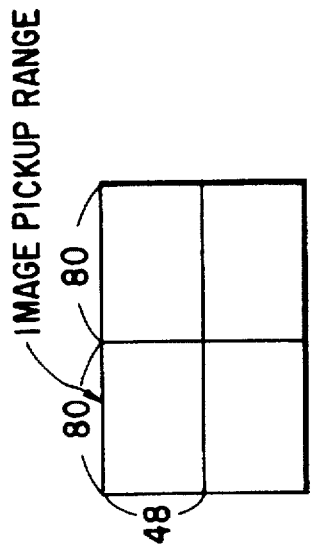
FIG. 7 is a view showing the block arrangement of an image pickup element.

First of all, if only the image pickup element 16 has a defect, the following conditions are set (see FIG. 7). Blocks in FIG. 7 denote blocks including a two-dimensional data dot pattern array and a marker which are disclosed in International Publication No. WO 94/08314. Note that the error rate is roughly calculated with respect to user data.

Image Pickup Element: 500×300 (=150,000) pixels

Block Arrangement: 80×48 dots

Image Pickup Range: 4 (=2×2) block/screen

Defect Rate of Medium: $10^{-4}$ bits

Under the above conditions, the number of pixels of the image pickup element 16 per dot is Horizontal Direction: 500/(80×2)=3

Vertical Direction: 300/(48×2)=3

Nine pixels (cells) of the image pickup element 16 correspond to one dot. If only one defect is present in the range of 3×3 pixels (in the case of a random defect), there is no problem.

On the other hand, in the case of continuous defects, if defects corresponding to 2×2 pixels are present, dot detection is difficult.

In general, if the (byte) error rate is about $10^{-12}$, no problem occurs in data recording and reproduction. Assuming that the data error correction section 194 has an ability to correct an error rate of $10^{-2}$ to $10^{-12}$ in error detection/correction processing, a bit error rate of about $10^{-3}$ can be allowed in dot detection.

The data amount in one screen is

80×48×4=15,360 (bits)

to obtain 15,360×$10^{-3}$=15

On the other hand, the number of defects of a medium itself is 15,360×$10^{-4}$=1.5

That is, an allowable number of defects corresponding to 2×2 pixels in 150,000 pixels is 15−1.5=13 (portions)

In this case, the defect rate is

13×4/150,000=3.5×$10^{-4}$

Next, the case in which both the image pickup element 16 and the image memory 214 have defects will be described.

From the above description, an allowable error is a 13-bit error between the image pickup element 16 and the data error correction section 194.

Assume that the image pickup element 16 has 10 error portions (the defect rate is 10×4/150,000=2.7×$10^{-4}$).

Since the 10-bit error occurs, 3 bits are assigned to the image memory 214 to obtain 3 bits/15,360 bits=1.9×$10^{-4}$ That is, Image Pickup Element: 2.7×$10^{-4}$ Memory: 1.9×$10^{-4}$ Data in the image memory 214 is data before deinterleave processing. Even if adjacent defects are present, these defects are decentralized by deinterleave processing to reduce the influence of the defects. In addition, scattered defects rarely match an interleave rule. In any case, a burst error rarely occurs.

Note that, in reproducing, e.g., a general optical (magnetic) disk, if a defect is present at any portion, data cannot be read because the relationship between a sensor (servo cell or data read cell) and a track/data is fixed. To the contrary, as for a two-dimensional code to which this embodiment is applied, the relationship between a dot on an information recording medium and a read cell is not fixed because the two-dimensional code is manually scanned by an area sensor (reading section). That is, even if a defect is on a dot to fail to read the dot, the defect can be expected not to overlap a dot in the next reading operation. The probability of reading a dot by a retry is high. Therefore, even if the number of the defects of the image pickup element 16 or the image memory 214 exhibits a limit value in the above example, a dot may be read by this retry, and a margin is still left.

In allotting errors between the image pickup element 16 and the image memory 214, a larger number of defects are allotted on the image pickup element side because a memory generally has a higher yield (a smaller number of defects) than that of an image pickup element. Various situations may occur on the yield depending on the structure of each element. In such a case, an allowable defect count is properly set such that an element having a lower yield has a larger number of defects.

As for error distribution, it has been described that an error rate of $10^{-12}$ is required in general information recording and reproduction. This error rate is for devices such as an auxiliary memory device of a computer, and is a standard when data is frequently read, and the data amount to be handled is large. When the amount of data to be read by a device within the period of service is small, the error rate of $10^{-12}$ is not necessarily required, and a lower error rate can be sufficiently practical. For example, if a file to be read has a capacity of about 10 KB, and the number of reading operations is about $10^4$=10,000 within the period of service of a device (the service life of a device), no error occurs at an error rate of $10^{-9}$ (=1/100,000*10*$10^3$) or less. Assume that the information reproduction system of this embodiment is used for a purpose in which two-dimensional codes are recorded in a picture book, and speech corresponding to each picture is reproduced. In this case, a sufficient error rate is about $10^{-9}$. Therefore, a larger number of defects can be allowed to further reduce the cost.

Figure 8:
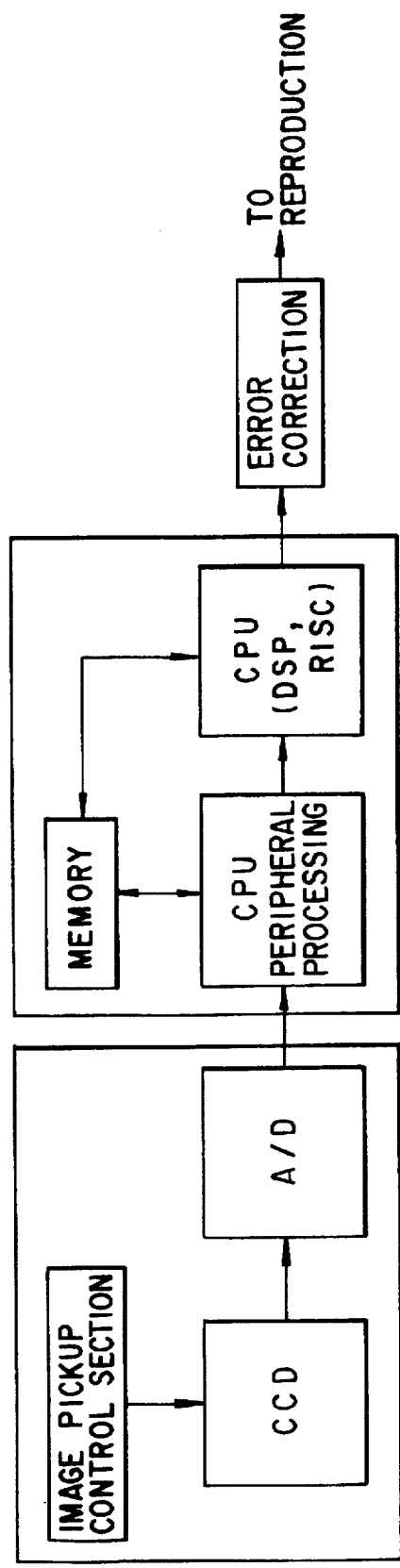
FIG. 8 is a block diagram for explaining a modification of the information reproduction system.

Note that a circuit arrangement as the base of IC formation is not limited to the above embodiments. For example, as shown in FIG. 8, the scan conversion section, the data demodulating section, and the binarization function are constituted by an image memory and a CPU (DSP or RISC chip). A circuit arrangement is simplified utilizing software processing. The obtained arrangement can be realized by an IC. In addition, part of DSP processing may be formed into an IC to increase the speed.

The present invention has been described on the basis of the above embodiments. The present invention, however, is not limited to the above embodiments, and various changes and modifications are deemed to lie within the spirit and scope of the present invention. The spirit and scope of the present invention will be summarized below.

(1) An information reproduction system comprising:
reading means for optically reading a code from an information recording medium having a portion at which multimedia information including at least one of audio information, image information, and digital code data is recorded as an optically readable code;

processing means for processing the code read by the reading means to reconstitute the original multimedia information; and output means for reproducing and outputting each information on the basis of an output signal from the processing means.

is characterized in that the reading means comprises an image pickup element for optically picking up the code to output an image signal, and optical means for optically inputting the code to the image pickup element, and the image pickup element and the optical means are arranged integrally.

That is, the optical element and the image pickup element are integrated with each other to form a single component.

By integration, downsizing can be realized as a whole. The number of components to be mounted can be decreased, and the cost and adjustment expenses can be reduced. The unit can be commonly used for systems having various outer shapes.

(2) An information reproduction system according to arrangement (1) is characterized in that the image pickup element integrally arranged on the optical means, and the processing means are arranged on a common board.

That is, the optical element, the image pickup element, and the processing means are integrated on a single board to realize main functions by one component (board unit).

By integration, downsizing can be realized. The number of components to be mounted can be decreased, and the cost and adjustment expenses can be reduced. In addition, since adjustment and inspection can be performed for each unit, no defect is found after mounting the units on the main body. Further, since main components are formed as a unit, the unit can be used as a common component.

(3) An information reproduction system according to arrangement (2) is characterized in that the optical means integrally arranged on the image pickup element is an integrally molded lens having at least an aspherical lens and an aberration correction mirror section.

That is, the optical element is obtained by integrally molding the aspherical lens and the aberration correction reflecting surface. A high-performance optical function is realized by a single component.

Since the aspherical surface and the aberration correction reflecting surface are used, optical functions corresponding to the arrangements of a plurality of lenses and a reflecting component are realized by a single component. With this structure, an adjustment error can be eliminated, the number of components to be mounted can be decreased, optical performance can be improved, and the cost and adjustment cost can be reduced. In addition, since the optical system itself can be checked, no defect is found after the assembly.

(4) An information reproduction system according to arrangement (2) is characterized in that the processing means comprises a memory for storing an image signal output from the image pickup element, and an integrated circuit for reconstituting the multimedia information from the image signal, and all of the image pickup element, the memory, and the integrated circuit are semiconductor elements fabricated by a semiconductor manufacturing method, and at least one of the elements is a defective element due to the semiconductor manufacturing method.

That is, electrical circuits which may include defects are formed into an IC and integrated with the optical element.

By forming the processing circuit into an IC, downsizing, cost reduction, high reliability can be realized. By using a defective component, the yield is increased at a component level to greatly reduce the costs of components.

(5) An information reproduction system according to arrangement (4) is characterized in that each of the defective image pickup element, the defective memory, and the defective integrated circuit has a defect rate in accordance with the yield of a corresponding semiconductor manufacturing method, a predetermined allowable defect rate is set for each element, and an element selected in accordance with the predetermined defect rate is used.

That is, a component selection standard is set for each element.

Since the allowable type and number of defects are set for each element, selection is efficiently performed to increase the yield. The costs of components can be further reduced.

(6) An information reproduction system according to arrangement (5) is characterized in that the predetermined defect rates are selected such that the defect rates of the integrated circuit, the memory, and the image pickup element sequentially increase, and the information reproduction system further comprises defect error correction means for correcting an error caused by the defect.

That is, the determination criterion becomes stricter in an order of the image pickup element, the memory, and the circuit. Further, an error correction means is connected to the output of the defect error correction means.

Since an actual yield situation can be coped with, the yield is increased. The costs of components can be further reduced. By performing error correction, the influence of defects can be eliminated.

(7) An information reproduction system according to arrangement (2) is characterized in that the optical means integrally comprises illumination means for illuminating the code.

That is, the optical system, the image pickup system, the processing system, and the illumination means are integrated on a single board.

By integration including the illumination means, downsizing can be realized. The number of components to be mounted can be decreased, and the cost and adjustment cost can be reduced. In addition, since adjustment including illumination condition adjustment and inspection can be performed for each unit, no defect is found after mounting units on the main body. Further, main components are formed as a unit, and the unit can be used as a common component.

(8) An information reproduction system according to arrangement (2) is characterized in that the outer shape of the reading means is any one of a mouse-type and hand-held-type shapes.

That is, the outer shape and dimension are equal to those of a general device which allow a manual operation.

With the outer shape and dimension which allow a manual operation, integration becomes enhanced. In addition, with a general shape, the operator can smoothly operate the device.

(9) An information reproduction system according to arrangement (2) is characterized in that the reading means integrally comprises coordinate generation means for generating a coordinate.

That is, both the function of a pointing device such as a mouse, and a code reading function are provided by a single device.

In reproducing multimedia information, if the coordinate generator can interface with a user through a CRT, a flexible system can be obtained. If the same operation section can be used, the operator need not change the current operation section with another, so that the operation becomes easy.

(10) An information reproduction system according to arrangement (2) is characterized in that the reading means has a pen-type shape, and the board is arranged along the longitudinal direction of the reading means, and the optical means has means for reflecting incident light at a substantially right angle so as to form an image from the incident light on the image pickup element arranged on the board with its imaging plane facing upward.

That is, the optical axis is bent from the pen axis direction to the direction perpendicular to it through the pen-type shape. The longitudinal direction of the board corresponds to the pen axis direction.

The board, therefore, is easily accommodated in the pen-type shape.

(11) An information reproduction system according to arrangement (2) is characterized in that the optical means integrally arranged on the image pickup element is an integrally molded lens having a concave lens surface on the image pickup element side.

That is, the shape of a mounting portion becomes simple, and an optical problem (flare and positional precision) rarely arises.

(12) An information reproduction system according to arrangement (11) is characterized in that part of a molded body of the integrally molded lens serves as the mounting portion, and the mounting portion is directly inserted under pressure or fitted on the board on which the image pickup element is mounted.

That is, a mounting problem, and problems caused by time, scattering, disassembly, and spreading can be avoided to increase the assembly precision.

(13) An information reproduction system according to arrangement (2) is characterized in that a ring-like illumination unit is inserted under pressure or fitted on the objective plane side of the optical means integrally arranged on the image pickup element.

That is, even if the reading means is compact, or the diameter of its outer shape is small, the illumination unit can be easily mounted.

(14) An information reproduction system according to arrangement (2) is characterized in that the height of the optical means integrally arranged on the image pickup element from the mounting board substantially determines the height of the board in the reading means.

That is, the height of the reading means is substantially uniquely determined in accordance with the height of the optical system. The mechanical design of the reading means becomes simple. At the same time, the board can be easily mounted even if the reading means is compact, or the diameter of its outer shape is small.

(15) An information reproduction system according to arrangement (2) is characterized in that the optical means integrally arranged on the image pickup element reflects at least once light incident from a reading opening portion formed in the mounting surface of the image pickup element with respect to the board to form an image on the image pickup element.

That is, assembly and maintenance can be easily performed from only one side (e.g., upper side). In addition, since the height of the optical system is decreased, a mouse shape and the like can be employed as the outer shape of the reading means.

(16) An information reproduction system comprising:

reading means for optically reading a code from an information recording medium having a portion at which multimedia information including at least one of audio information, image information, and digital code data is recorded as an optically readable code;

processing means for processing the code read by the reading means to reconstitute the original multimedia information; and output means for reproducing and outputting each information on the basis of an output signal from the processing means, is characterized in that the reading means comprises an image pickup element for optically picking up the code to output an image signal, and optical means for optically inputting the code to the image pickup element, the processing means comprises a memory for storing an image signal output from the image pickup element, and an integrated circuit for reconstituting the multimedia information from the image signal, and all of the image pickup element, the memory, and the integrated circuit are semiconductor elements fabricated by a semiconductor manufacturing method, and at least one of the elements is a defective element due to the semiconductor manufacturing method.

That is, each electrical circuit function may include defects.

The costs of components, therefore, are reduced.

(17) An information reproduction system according to arrangement (16) is characterized in that each of the defective image pickup element, the defective memory, and the defective integrated circuit has a defect rate in accordance with the yield of a corresponding semiconductor manufacturing method, a predetermined allowable defect rate is set for each element, and an element selected in accordance with the predetermined defect rate is used.

That is, a component selection standard is set for each element.

Since the allowable type and number of defects are set for each element, selection is efficiently performed to increase the yield. The costs of components can be further reduced.

(18) An information reproduction system according to arrangement (17) is characterized in that the predetermined defect rates are selected such that the defect rates of the integrated circuit, the memory, and the image pickup element sequentially increase.

That is, the determination criterion becomes stricter in an order of the image pickup element, the memory, and the circuit. Further, an error correction means is connected to the output of the defect error correction means.

Since an actual yield situation can be coped with, the yield is increased. The costs of components can be further reduced. By performing error correction, the influence of defects can be eliminated.

(19) An information reproduction system according to arrangement (17) is characterized in that the information reproduction system further comprises defect error correction means for correcting an error caused by the defect of each element.

That is, a component selection standard is set for each element component.

Error correction is performed to eliminate the influence of defects.

(20) An information reproduction system according to arrangement (17) is characterized in that a plurality of functions of the reading means, the processing means, and the output means are classified on the basis of the predetermined allowable defect rates of the respective elements, and a plurality of functions of each classification in which the elements have defect rates close to a certain defect rate are arranged on a single semiconductor substrate for each element.

That is, circuits are classified on the basis of respective selection standards and formed into corresponding ICs.

Since a circuit section based on a different standard is not on a single IC, it can be avoided to judge an IC to be a defective IC due to a portion based on a strict standard and to waste an acceptable portion based on a non-strict standard.

(21) An information reproduction system according to arrangement (20) is characterized in that a plurality of functions of the reading means, the processing means, and the output means include at least one of a code image pickup function, an analog/digital conversing function, a signal storage (memory) function, a signal demodulation function, an error correction function, a signal output function, and an interface function.

That is, circuits are classified on the basis of respective selection standards and formed into corresponding ICs.

Since a circuit section based on a different standard is not in a single IC, it can be avoided to judge an IC to be a defective IC due to a portion based on a strict standard and to waste an acceptable portion based on a non-strict standard.

(22) An information reproduction system is characterized by comprising:
- a code reading section capable of manual scanning to read a code on a recording medium;
- an information processor having an expansion slot to execute predetermined processing upon reception of data from a card-type board inserted in the expansion slot;
- the card-type board inserted in the expansion slot of the information processor to demodulate and process input data, thereby supplying the resultant data to the information processor; and
- a wireless data transmission/reception means arranged between the code reading section and the card-type board.

That is, a processing circuit is mounted on a compact card-type board and wireless-connected to the reading section.

Since the processing circuit is integrated with the main body of the information processor such as a personal computer, downsizing can be realized as a whole. In particular, a compact system can be obtained in combination with an information processing terminal such as a notebook-type personal computer or a wordprocessor. In addition, since the reading section is separated from the processing circuit (processing section), inconvenience such as cable entangling can be avoided, and scanning becomes very easy.

(23) An information reproduction system is characterized by comprising:
- a code reading section capable of manual scanning to read a code on a recording medium;
- an information processor having an expansion slot to execute predetermined processing upon reception of data from a processing section inserted in the expansion slot;
- the processing section inserted in the expansion slot of the information processor to demodulate and process input data, thereby supplying the resultant data to the information processor; and
- wireless data transfer means arranged between the code reading section and the processing section.

That is, the processing section is wireless-connected to the reading section and also connected to the interface of the information processor.

Since the reading section is separated from the processing circuit, inconvenience such as cable entangling can be avoided, and scanning becomes very easy. Since the processing section is connected to the interface of the information processor, a new board need not be added.

(24) An information reproduction system is characterized by comprising:
- a code reading section capable of manual scanning to read a code on a recording medium;
- a television image receiver for receiving television broadcasting;
- a game device connected to the television image receiver and having television speech and image signal output functions;
- a processing section connected to the game device to demodulate and process input data and to supply the result to the game device, thereby supplying speech and image signals corresponding to the result from the game device to the television image receiver; and
- wireless data transmission/reception means arranged between the code reading section and the processing section.

That is, a signal is output to the television image receiver through the game device. The processing section is mounted on the cassette of the game device. The game device provides as a visualizing function.

Since both the game device and the television image receiver are popular, the number of new devices which the user must purchase is decreased. In addition, since the game device provides a visualizing function, the number of circuits in the demodulation processing section is decreased to reduce the cost. Further, since the reading section is separated from the processing circuit, inconvenience such as cable entangling can be avoided, and an operation becomes very easy.

(25) An information reproduction system is characterized by comprising:
- a code reading/processing section capable of manual scanning to read a code on a recording medium to perform demodulation and processing; and
- a radio device for receiving radio broadcasting,
- wherein the code reading/processing section comprises a transmission function for transmitting a speech signal demodulated and processed so as to allow the radio device to receive.

That is, the radio device is wireless-connected to the code reading/processing section.

Since the radio device is popular, the number of new devices which the user must purchase is decreased. In addition, since the radio device provides a speech generating function, the number of circuits in the code reading/processing section is decreased to reduce the cost. Further, since the code reading/processing section is separated from a speech reproduction section, an operation becomes very easy (inconvenience such as cable entangling can be avoided). At the same time, the speech reproduction section can be set at a remote location.

(26) An information reproduction system is characterized by comprising:
- a code reading section capable of manual scanning to read a code on a recording medium;
- a processing section for demodulating and processing data from the code reading section to obtain a speech signal;
- data transmission means for wireless-transmitting the speech signal obtained in the processing section;
- a reception unit for receiving the speech signal wireless-transmitted by the data transmission means; and
- electric/speech conversion means connected to the reception unit to convert the speech signal received by the reception unit into speech, thereby outputting the speech.

That is, the processing section is wireless-connected to the reproduction section (the reception unit, and the electric/speech conversion means, i.e., a headphone).

Therefore, downsizing can be realized as a whole, and the user can carry the device on his/her body and move. In addition, the code reading section and the processing section are wireless-connected to the reproduction section, so that the movement of the body is not limited.

(27) An information reproduction system is characterized by comprising:

- a code reading/processing section capable of manual scanning to read a code on a recording medium to perform demodulation and processing; and
- a music information medium reproducer having an external input terminal to reproduce and output music information recorded on a music information medium, and to reproduce and output a speech signal input from the external input terminal,
- wherein the code reading/processing section supplies a speech signal demodulated and processed to the external input terminal of the music information medium reproducer.

That is, music is reproduced from a music information medium such as a CD or a cassette tape through the music information medium reproducer 70 (using an amplification function).

By using the music information medium reproducer including a headphone, the number of new devices which the user must purchase is decreased. In addition, since the music information medium reproducer provides part of a speech generating function, the number of circuits in the code reading/processing section is decreased to reduce the cost.

(28) An information reproduction system is characterized by comprising:

- a code reading/processing section capable of manual scanning to read a code on a recording medium to perform demodulation and processing, thereby obtaining a speech signal;
- data transmission means for wireless-transmitting the speech signal obtained in the code reading/processing section;
- a reception unit for receiving the speech signal wireless-transmitted by the data transmission means; and
- electric/speech conversion means connected to the reception unit to convert the speech signal received by the reception unit into speech, thereby outputting the speech.

That is, the code reading/processing section is wireless-connected to the reproduction section (the reception unit, and the electric/speech conversion means, i.e., a headphone).

Therefore, downsizing can be realized as a whole, and the user can carry the device on his/her body and move. In addition, the code reading/processing section are wireless-connected to the reproduction section, so that the movement of the body is not limited.

(29) An information reproduction system is characterized by comprising:

- a code reading/processing section capable of manual scanning to read a code on a recording medium to perform demodulation and processing, thereby obtaining a speech signal;
- speech signal transmission means for wireless-transmitting the speech signal obtained in the code reading/processing section;
- a magnetic tape reproducer for reproducing and outputting a speech signal recorded on a magnetic tape; and
- a reception adaptor for receiving the speech signal wireless transmitted by the speech signal transmission means to output the speech signal to a reproducing head of the magnetic tape reproducer by magnetic coupling.

That is, the reception adaptor is used for outputting a speech signal to the reception head of the magnetic tape reproducer by magnetic coupling. The magnetic tape reproducer provides part of a speech generating function.

By using the magnetic tape reproducer including a headphone, the number of new devices which the user must purchase is decreased. In addition, since the magnetic tape reproducer provides part of a speech generating function, the number of circuits in a demodulation/processing circuit section to be mounted on the code reading/processing section is decreased to reduce the cost. Further, since the code reading/processing section is separated from the reproduction section, inconvenience such as cable entangling can be avoided, and an operation becomes very easy.

(30) An information reproduction system is characterized by comprising:

- a code reading/processing section capable of manual scanning to read a code on a recording medium;
- signal transmission means for wireless-transmitting a signal corresponding to the code from the code reading section;
- a magnetic tape reproducer for reproducing and outputting a speech signal recorded on a magnetic tape; and
- a reception adaptor for receiving the signal corresponding to the code wireless-transmitted by the signal transmission means to demodulate and process the signal, thereby obtaining a speech signal and outputting it to a reproducing head of the magnetic tape reproducer by magnetic coupling.

That is, the reception adaptor for outputting a speech signal to the reception head of the magnetic tape reproducer by magnetic coupling is used. The magnetic tape reproducer provides part of a speech generating function.

By using the magnetic tape reproducer including a headphone, the number of new devices which the user must purchase is decreased. In addition, since the magnetic tape reproducer provides part of a speech generating function, the number of circuits in a demodulation/processing circuit section to be mounted on the reception adaptor is decreased to reduce the cost. Further, the code reading section is separated from the reproduction section, inconvenience such as cable entangling can be avoided, and an operation becomes very easy.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An information reproduction system comprising:

reading means for optically reading a code from an information recording medium having a portion at which original multimedia information including at least one of audio information, image information, and digital code data is recorded as an optically readable code;

processing means for processing the code read by said reading means to reconstitute the original multimedia information; and output means for reproducing and outputting each information based on an output signal from said processing means, wherein:

said reading means comprises an image pickup element for optically picking up the code to output an image signal, and optical means for optically inputting the code to said image pickup element, said optical means is formed on a same board on which said image pickup element is provided so that said optical means and the board form one piece, and said optical means forms a recessed portion for accommodating said image pickup element on a mounting portion with respect to said board, thereby enabling said image pickup element to be arranged on said board so that said optical means and said board form said one piece.

2. An information reproduction system according to claim 1, wherein said processing means is arranged on said same board.

3. An information reproduction system according to claim 2, wherein said optical means comprises an integrally molded lens system including at least an aspherical lens and an aberration correction mirror section.

4. An information reproduction system according to claim 2, wherein:

said processing means comprises a memory for storing an image signal output from said image pickup element, and an integrated circuit for reconstituting the original multimedia information from the image signal, and all of said image pickup element, said memory and said integrated circuit are semiconductor elements fabricated by respective semiconductor manufacturing methods, and at least one of said image pickup element, said memory and said integrated circuit is a defective element.

5. An information reproduction system according to claim 4, wherein said defective element has a defect rate in accordance with a yield of a corresponding one of the respective semiconductor manufacturing methods, a predetermined allowable defect rate is set for each of the respective semiconductor manufacturing methods, and said image pickup element, said memory and said integrated circuit are selected in accordance with the respective predetermined defect rates.

6. An information reproduction system according to claim 5, wherein:

the predetermined defect rates are selected such that the respective defect rates of said integrated circuit, said memory, and said image pickup element sequentially increase, and said information reproduction system further comprises defect error correction means for correcting an error caused by the respective defects.

7. An information reproduction system according to claim 2, wherein said optical means further comprises illumination means for illuminating the code, said illumination means being arranged so that said optical means and said illumination means form one piece.

8. An information reproduction system according to claim 2, wherein said reading means has an outer shape which is one of a mouse shape and a hand-held shape.

9. An information reproduction system according to claim 2, wherein said reading means comprises coordinate generation means for generating a coordinate, said coordinate generation means being arranged so that said reading means and said coordinate generation means form one piece.

10. An information reproduction system according to claim 2, wherein:

said reading means has a pen shape, and said board is arranged along a longitudinal direction of said reading means, and said optical means includes means for reflecting incident light at a substantially right angle so as to form an image from light incident on an imaging plane of said image pickup element, said image pickup element being arranged on the board with the imaging plane thereof facing upward.

11. An information reproduction system according to claim 2, wherein said optical means comprises an integrally molded lens having a concave lens surface on an image pickup element side of said optical means.

12. An information reproduction system according to claim 11, wherein a portion of a molded body of said integrally molded lens serves as said mounting portion, and said mounting portion is directly inserted under pressure or fitted on said board.

13. An information reproduction system according to claim 2, wherein a ring illumination unit is inserted under pressure or fitted on an objective plane side of said optical means.

14. An information reproduction system according to claim 2, wherein a height of said optical means from said board substantially determines a height of said board with respect to said reading means.

15. An information reproduction system according to claim 2, wherein said optical means reflects at least once light incident from an opening portion formed in a same side of said board on which said image pickup element is arranged, to thereby form an image on said image pickup element.

16. An information reproduction system comprising:

reading means for optically reading a code from an information recording medium having a portion at which original multimedia information including at least one of audio information, image information, and digital code data is recorded as an optically readable code;

processing means for processing the code read by said reading means to reconstitute the original multimedia information; and output means for reproducing and outputting each information based on an output signal from said processing means, wherein:

said reading means comprises an image pickup element for optically picking up the code to output an image signal, and optical means for optically inputting the code to said image pickup element, said processing means comprises a memory for storing an image signal output from said image pickup element, and an integrated circuit for reconstituting the original multimedia information from the image signal, and all of said image pickup element, said memory and said integrated circuit are semiconductor elements fabricated by respective semiconductor manufacturing methods, and at least one of said image pickup element, said memory and said integrated circuit is a defective element.

17. An information reproduction system according to claim 16, wherein said defective element has a defect rate in accordance with a yield of a corresponding one of the respective semiconductor manufacturing methods, a predetermined allowable defect rate is set for each of the respective semiconductor manufacturing methods, and said image pickup element, said memory and said integrated circuit are selected in accordance with the respective predetermined defect rates.

18. An information reproduction system according to claim 17, wherein the predetermined defect rates are selected such that the respective defect rates of said integrated circuit, said memory, and said image pickup element sequentially increase.

19. An information reproduction system according to claim 17, further comprises defect error correction means for correcting an error caused by the respective defects.

20. An information reproduction system according to claim 17, wherein a plurality of functions of said reading means, said processing means, and said output means are classified based on the predetermined allowable defect rates of said respective elements, and a plurality of functions of each classification in which said elements have defect rates close to a certain defect rate are arranged on a single semiconductor substrate for each element.

21. An information reproduction system according to claim 20, wherein said plurality of functions of said reading means, said processing means, and said output means include at least on of a code image pickup function, an analog/digital conversing function, a signal storage function, a signal demodulation function, an error correction function, a signal output function and an interface function.

22. An information reproduction system comprising:
reading means for optically reading a code from an information recording medium having a portion at which original multimedia information including at least one of audio information, image information, and digital code data is recorded as an optically readable code;
processing means for processing the code read by said reading means to reconstitute the original multimedia information; and
output means for reproducing and outputting each information based on an output signal from said processing means,
wherein:
said reading means comprises an image pickup element for optically picking up the code to output an image signal, and optical means for optically inputting the code to said image pickup element,
said image pickup element and said optical means are arranged integrally as one piece,
said processing means comprises a memory for storing the image signal output from said image pickup element, and an integrated circuit for reconstituting the original multimedia information from the image signal, and
all of said image pickup element, said memory, and said integrated circuit are semiconductor elements fabricated by respective semiconductor manufacturing methods, and at least one of said image pickup element, said memory and said integrated circuit is a defective element.

23. An information reproduction system comprising:
reading means for optically reading a code from an information recording medium having a portion at which original multimedia information including at least one of audio information, image information, and digital code data is recorded as an optically readable code;
processing means for processing the code read by said reading means to reconstitute the original multimedia information; and
output means for reproducing and outputting each information based on an output signal from said processing means,
wherein:
said reading means comprises an image pickup element for optically picking up the code to output an image signal, and optical means for optically inputting the code to said image pickup element,
said image pickup element and said optical means are arranged integrally as one piece,
said processing means comprises a memory for storing the image signal output from said image pickup element, and an integrated circuit for reconstituting the original multimedia information from the image signal,
all of said image pickup element, said memory, and said integrated circuit are semiconductor elements fabricated by respective semiconductor manufacturing methods, and at least one of said image pickup element, said memory and said integrated circuit is a defective element, and
said defective element has a defect rate in accordance with a yield of a corresponding one of the semiconductor manufacturing methods, a predetermined allowable defect rate is set for each of the respective semiconductor manufacturing methods, and said image pickup element, said memory and said integrated circuit are selected in accordance with the respective predetermined defect rates.

24. An information reproduction system comprising:
reading means for optically reading a code from an information recording medium having a portion at which original multimedia information including at least one of audio information, image information, and digital code data is recorded as an optically readable code;
processing means for processing the code read by said reading means to reconstitute the original multimedia information; and
output means for reproducing and outputting each information based on an output signal from said processing means,
wherein:
said reading means comprises an image pickup element for optically picking up the code to output an image signal, and optical means for optically inputting the code to said image pickup element,
said image pickup element and said optical means are arranged integrally as one piece,
said processing means comprises a memory for storing the image signal output from said image pickup element, and an integrated circuit for reconstituting the original multimedia information from the image signal,
all of said image pickup element, said memory, and said integrated circuit are semiconductor elements fabricated by respective semiconductor manufacturing methods, and at least one of said image pickup element, said memory and said integrated circuit is a defective element,
said defective element has a defect rate in accordance with a yield of a corresponding one of the semiconductor manufacturing methods, a predetermined allowable defect rate is set for each of the respective semiconductor manufacturing methods, and said image pickup element, said memory and said integrated circuit are selected in accordance with the respective predetermined defect rates, the predetermined defect rates are selected such that the respective defect rates of said integrated circuit, said memory, and said image pickup element sequentially increase, and said information reproduction system further comprises defect error correction means for correcting an error caused by the respective defects.

25. An information reproduction system comprising:

reading means for optically reading a code from an information recording medium having a portion at which original multimedia information including at least one of audio information, image information, and digital code data is recorded as an optically readable code;

processing means for processing the code read by said reading means to reconstitute the original multimedia information; and output means for reproducing and outputting each information based on an output signal from said processing means, wherein:
 said reading means comprises an image pickup element for optically picking up the code to output an image signal, and optical means for optically inputting the code to said image pickup element,
 said image pickup element and said optical means are arranged integrally as one piece,
 said reading means has a pen shape, and said board is arranged along a longitudinal direction of said reading means, and said optical means includes means for reflecting incident light at a substantially right angle so as to form an image from light incident on an imaging plane of said image pickup element, said image pickup element being arranged on the board the imaging plane thereof facing upward.

26. An information reproduction system comprising:

reading means for optically reading a code from an information recording medium having a portion at which original multimedia information including at least one of audio information, image information, and digital code data is recorded as an optically readable code;

processing means for processing the code read by said reading means to reconstitute the original multimedia information; and output means for reproducing and outputting each information based on an output signal from said processing means, wherein:
 said reading means comprises an image pickup element for optically picking up the code to output an image signal, and optical means for optically inputting the code to said image pickup element,
 said image pickup element and said optical means are arranged integrally as one piece,
 said optical means comprises an integrally molded lens having a concave lens surface on an image pickup element side of said optical means, and
 a portion of a molded body of said integrally molded lens serves as said mounting portion, and said mounting portion is directly inserted under pressure or fitted on said board.

* * * * *